United States Patent [19]

Sasaoka et al.

[11] Patent Number: 5,438,640
[45] Date of Patent: Aug. 1, 1995

[54] OPTICAL WAVEGUIDE DEVICE FOR RECEIVING FUNCTIONAL COMPONENT

[75] Inventors: Eisuke Sasaoka; Hiroo Kanamori; Hiroshi Suganuma; Shinji Ishikawa; Tatsuhiko Saito, all of Yokohama, Japan

[73] Assignee: Sumitomo Electric Industries, Ltd., Osaka, Japan

[21] Appl. No.: 225,716

[22] Filed: Apr. 8, 1994

[30] Foreign Application Priority Data

Jul. 16, 1993 [JP] Japan ................... 5-176974

[51] Int. Cl.$^6$ ................................ G02B 6/26
[52] U.S. Cl. ........................ 385/43; 385/24; 385/44; 385/48
[58] Field of Search ................... 385/15–17, 385/24, 39, 43–48, 129, 130, 132

[56] References Cited

U.S. PATENT DOCUMENTS

| | | | |
|---|---|---|---|
| 3,870,396 | 3/1975 | Racki et al. | 385/24 |
| 4,737,002 | 4/1988 | Boucouvalas | 385/43 X |
| 5,165,001 | 11/1992 | Takagi et al. | 385/43 X |

FOREIGN PATENT DOCUMENTS

| | | |
|---|---|---|
| 0411607 | 2/1991 | European Pat. Off. . |
| 0509236 | 10/1992 | European Pat. Off. . |
| 0519475 | 12/1992 | European Pat. Off. . |
| 0530915 | 3/1993 | European Pat. Off. . |
| 2304935 | 10/1976 | France .............. 385/45 |
| 2930681 | 2/1981 | Germany ............. 385/43 |
| 2213954 | 8/1989 | United Kingdom . |

OTHER PUBLICATIONS

Morio Kobayashi, Small–Loss Quartz–Based Optical Waveguide, Optronics Magazine, 1992, No. 6, pp. 61–67 (partial translation).

R. Zengerle et al., Fabrication of Optical Beamwidth Transformers for Guided Waves on InP Using Wedge–shaped Taper Structures, Journal of Vacuum Science & Technology: B9 (6), Nov./Dec. 1991, pp. 3459–3463.

Primary Examiner—John D. Lee
Attorney, Agent, or Firm—Cushman Darby & Cushman

[57] ABSTRACT

The present invention comprises a waveguide substrate and an optical waveguide disposed on the substrate, the optical waveguide having an optical waveguide region as a light transmission path, an insertion region for inserting an optical functional component having a mode field width of light propagating therein larger than that of light propagating in the optical waveguide region, and an optical connection region provided between the optical waveguide region and the insertion region to change a mode field width of light propagating therein.

18 Claims, 10 Drawing Sheets

OPTICAL WAVEGUIDE DEVICE FOR RECEIVING FUNCTIONAL COMPONENT

BACKGROUND OF THE INVENTION

1. Field of the Invention

The present invention relates to the structure of an optical waveguide device that functions while a functional component for performing optical branching, coupling, switching, and the like is inserted in the path of an optical waveguide and, more particularly, to a structure for facilitating manufacture of such a device which has a small transmission loss in an insertion region of the functional component.

2. Related Background Art

An optical device that performs optical branching, coupling, switching, and the like in a small region on an millimeter-order is a very important constituent element for downsizing or increasing the degree of functions of an optical communication system, an optical sensor, or the like. As such an optical device, a so-called parts insertion type optical waveguide device which functions by inserting a functional component for performing optical functions such as optical branching, coupling, switching, and the like in an optical waveguide has been attracting attention in recent years.

In this optical waveguide device, functions such as optical branching, coupling, and the like are conventionally realized by fabricating a directional coupler or an optical waveguide pattern having a structure of, e.g., a Y- or X-shaped waveguide, on a waveguide substrate. The switching function is realized by varying the propagation constant of the directional coupler.

Other than the method described above, the functions of branching, coupling, switching and the like of the optical waveguide device can be realized by incorporating a functional component that performs branching, coupling, switching, and the like in the path of the optical waveguide formed on the waveguide substrate.

FIG. 1 shows the arrangement of a conventional parts-insertion type optical waveguide device for realizing the optical branching function. In this conventional optical waveguide device, a half mirror 2 serving as a functional component for separating light is inserted at the intersecting portion (an insertion region where the functional component is to be inserted) of a T-shaped optical waveguide 1. The half mirror 2 has an angle of 45° with respect to the optical path of the light to be incident on it. In the conventional optical waveguide device, the core width of the optical waveguide 1 is constant (the refractive index difference between the core and the cladding layer is also constant). In this arrangement, light propagating through an incident side optical waveguide 1a (the incident side of the half mirror 2) is separated into a transmission-side optical waveguide 1b (the exit-side optical waveguide of the half mirror 2) and a reflection-side optical waveguide 1c (the reflection-side optical waveguide of the half mirror 2) by the half mirror 2.

The manufacturing steps of this conventional optical waveguide device will be described. Part of the intersecting portion (the insertion region where the functional component is to be inserted) of the T-shaped optical waveguide 1 formed in advance on the optical waveguide substrate (a portion indicated by a rectangle in FIG. 1) is removed with a laser beam or the like to form a space for inserting the half mirror 2 therein.

Then, the half mirror 2 as the functional component is inserted.

The conventional optical waveguide device is manufactured by performing the above manufacturing steps.

SUMMARY OF THE INVENTION

For example, the manufacturing steps of an optical waveguide device for optical branching are as follows. Part of the intersecting portion of the T-shaped optical waveguide 1 formed in advance on the waveguide substrate where a functional component, such as a half mirror or a beam splitter, is to be inserted is removed by a laser beam process or the like. Then, the functional component for realizing a desired function is inserted in a space formed by the laser beam process or the like. Generally, a material forming the optical waveguide and the space have different refractive indices. Thus, optical diffraction occurs at this portion, causing an excessive loss. The excessive loss is a transmission loss caused by factors other than attenuation of the propagating light. If the half mirror is not inserted at a correct position, the traveling path of the light incident on this half mirror is distorted, leading to an excessive loss again.

Therefore, in order to correctly insert the functional component, the process must be done with a micron- or submicron-order precision. With an optical waveguide device according to the present invention, the countermeasure as described above for decreasing the excessive loss caused by diffraction and improving a poor parts-insertion precision is not necessary. Also, this device can be manufactured easily (without requiring a high-precision process) with a good reproducibility while suppressing the transmission loss in the insertion region as compared to the conventional device.

The optical waveguide device according to the present invention is not limited to an optical waveguide device for optical branching but can also be applied to other parts-insertion type optical waveguide devices in which a functional component for performing optical coupling, switching, and the like is inserted.

An optical waveguide device according to the present invention comprises a waveguide substrate and an optical waveguide formed on the waveguide substrate and having a core for propagating light and a cladding layer covering the core. The optical waveguide is constituted by one or at least two optical waveguide regions serving as transmission paths of an optical signal, an insertion region having at least one input/output terminal of an optical signal and in which an optical functional component for realizing a desired function is to be inserted, and a first optical connection region having a first input/output terminal directly connected to one terminal of the optical waveguide region and a second input/output terminal directly connected to the input/output terminal of the insertion region. The mode field width of light propagating in the insertion region is larger than that of light at an arbitrary portion of the optical waveguide region.

In particular, the first optical connection region has a structure for properly connecting to the optical waveguide region and the insertion region having different mode field width of light propagating therein. In other words, the first optical connection region has a structure for changing the mode field width of light which becomes incident from the optical waveguide region side and emerges to the insertion region side or the mode field width of light which becomes incident from the insertion region side and emerges to the optical waveguide region side. Regarding a practical structure, the core size (e.g., the core width in the horizontal direction with respect to the main surface of the waveguide substrate) of the core of the first optical connection region is gradually increased from the first input/output terminal connected to the optical waveguide region toward the second input/output terminal connected to the insertion region. The size of the core of the first connection region is gradually decreased from the first input/output terminal connected to the optical waveguide region toward the second input/output terminal connected to the insertion region. At this time, the core size is set such that the core size at the first optical connection region in the vicinity of the connection surface with the insertion region becomes smaller than a core size that minimizes the mode field width of propagating light. In these arrangements, the sectional shape of the core in the horizontal direction along the surface of the waveguide substrate is narrowed or widened at a predetermined taper angle in the traveling direction of light. In other words, the sectional shape of the core may be similar to a trapezoid.

The optical waveguide of the optical waveguide device according to the present invention may also comprise a plurality of insertion regions. In this case, a second optical connection region is provided between each pair of insertion regions in order to provide a mode field width substantially the same as that of light propagating in these insertion regions. The second optical connection region has a core size substantially the same as that of each pair of insertion regions. The core size does not change between the incident and exit sides of light.

As described above, in the optical waveguide formed on the waveguide substrate by arbitrarily combining the optical waveguide region, the first and second optical connection regions, and the insertion region, a refractive index difference between the core and the cladding layer of a region where the first and/or second optical connection region directly connected to the insertion region is disposed is smaller than the refractive index difference between the core and the cladding layer at a predetermined portion of the optical waveguide region.

FIG. 2 is a graph showing the off-axis dependency of an optical excessive loss when the optical axis of the optical waveguide in the optical waveguide device according to the present invention is deviated. In FIG. 2, the broken line indicates the case of an optical waveguide that sets the mode field width of propagating light to 8 $\mu$m, and the solid line indicates the case of an optical waveguide that sets the mode field width of propagating light to 18 $\mu$m.

A spot size is a parameter two-dimensionally expressing the distribution of propagating light at a predetermined portion of the optical waveguide disposed on the waveguide substrate. In other words, assuming that the optical waveguide is cut perpendicularly to the traveling direction of light, a spot size means the size of the distribution of light having a predetermined light intensity or more at this section of the optical waveguide. More specifically, this distribution can be two-dimensionally grasped by setting the axis of abscissa as the distance from the optical axis of the core and the axis of ordinate as the light intensity.

In this specification, an area of the light distribution whose light intensity in the horizontal direction of the waveguide substrate is $1/e^2$ or more its peak value is defined as the mode field. The mode field width is uniformly defined as the maximum total width in the horizontal direction of the mode field defined in the above manner. On the other hand, the spot size, a general parameter, can be utilized instead of the mode field width so as to express the characteristics of the present invention.

As is apparent from FIG. 2, when the mode field width is increased, the absolute value of the optical excessive loss caused by deviation of the optical axis is decreased. In other words, the off-axis dependency of the excessive loss is decreased. Therefore, as in the optical waveguide device according to the present invention, the path of the optical waveguide for propagating light has a structure for increasing the mode field width at the insertion region where an optical functional component, such as a half mirror or a beam splitter, is inserted than a mode field width at other regions. Hence, even if the functional component is inserted with a poor precision, the excessive loss can be suppressed as compared to a conventional case wherein the mode field width is not increased.

The mode field width changes depending on the wavelength of propagating light, the refractive index difference between the core and the cladding layer of the optical waveguide, the core width, the core thickness, and the like. Therefore, the mode field width at the insertion region where the functional component is to be inserted can be increased. It might be especially effective if the core width at the input/output terminal of the insertion region is set to have a different value (larger or smaller than the width of the core at other portions) from the core width of other regions.

For this reason, according to the present invention, a connection region having a structure in which the core size (core width) is linearly changed is provided between the first and second input/output terminals.

FIG. 3 is a graph showing the relationship between the core width of the optical waveguide disposed on the waveguide substrate and the mode field width. The optical waveguide device of the example shown in FIG. 3 is manufactured by setting the optical waveguide to an $SiO_2$—$TiO_2$ type, the refractive index difference between the core, serving as the prospective optical waveguide, and the cladding layer to 0.3%, and the core thickness to 7 $\mu$m.

As is apparent also from FIG. 3, when, of the optical waveguide, the core width of the optical waveguide region is, e.g., 7 $\mu$m, the mode field width of this portion (insertion region) is increased by increasing the core width at the insertion region to be larger than 7 $\mu$m (a range indicated by P in FIG. 3). On the other hand, as shown in FIG. 3, when the core width is decreased to be smaller than a predetermined value, the mode field width is increased as well. This is because when the core width is decreased, the optical power confinement capability of the core exceeds its limit. Therefore, in the example of FIG. 3, when the core width of the optical waveguide region is 4 $\mu$m, the mode field width can be increased by decreasing the core width of the insertion region to about 2 $\mu$m (the range indicated by Q in FIG. 3) (note that all the core widths explained above are values at the core thickness of 7 $\mu$m).

In order to increase the mode field width, a means for decreasing the refractive index difference between the core and the cladding layer of the optical waveguide may also be employed. FIG. 4 is a graph showing the relationship between the refractive index difference between the core and the cladding layer and the mode field width. In an optical waveguide device shown in the example of FIG. 4, the optical waveguide is set to an $SiO_2$—$TiO_2$ type, and both the width and thickness of the core serving as the prospective optical waveguide are set to 7 μm.

As is apparent from FIG. 4, the mode field width can be increased by decreasing the refractive index difference between the core and the cladding layer.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
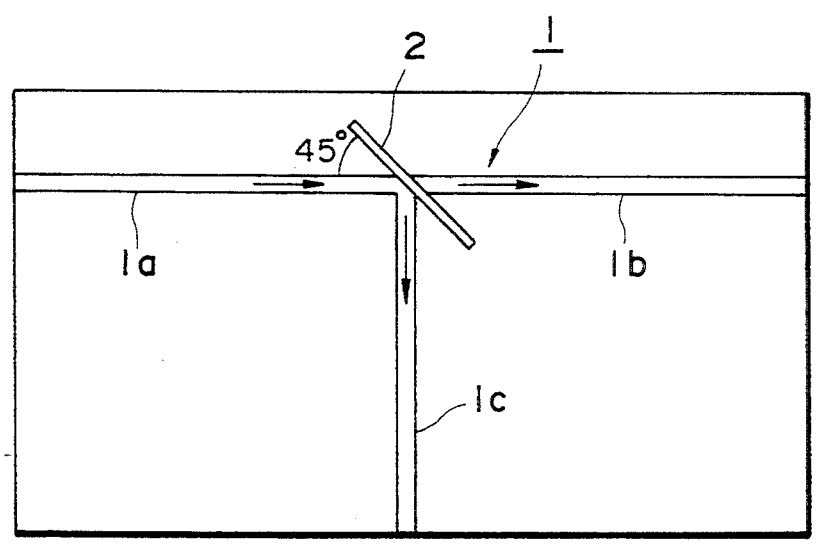
FIG. 1 is a view showing the structure of a conventional optical waveguide device.

An optical waveguide device according to the present invention will be described with reference to FIGS. 5 to 19. Note that same portions in the drawings are denoted by the same reference numerals, and a detailed description thereof will be omitted.

Figure 5:
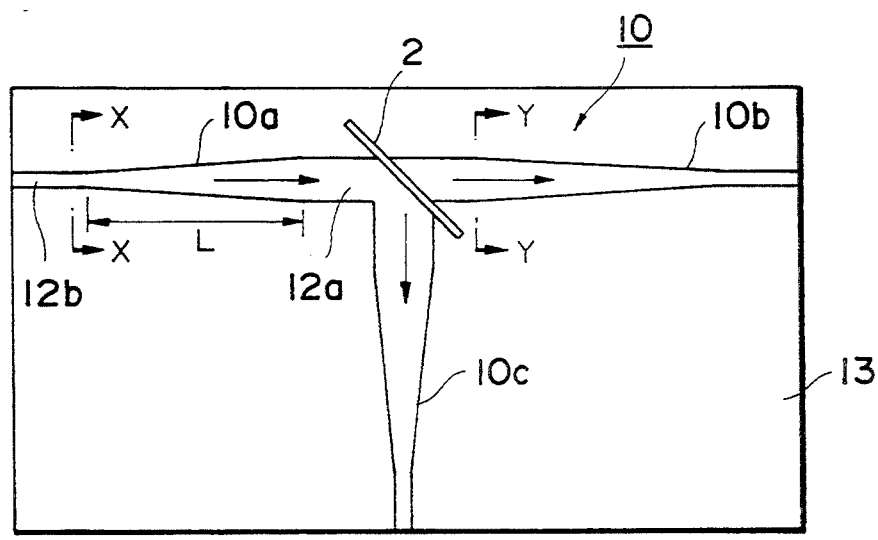
FIG. 5 is a view showing the arrangement of an optical waveguide device according to an embodiment of the present invention which realizes an optical branching function.

FIG. 5 shows the arrangement of a parts-insertion type optical waveguide device having an optical branching function as a typical embodiment of the optical waveguide device according to the present invention. This optical waveguide device is constituted by a waveguide substrate and a T-shaped buried type $SiO_2$—$TiO_2$ optical waveguide 10 formed on the waveguide substrate. A half mirror 2 serving as an optical functional component is inserted at the intersecting portion (insertion region possibly adapted to be inserted a functional component) of the optical waveguide 10. A dielectric thin film may be used as the optical functional component.

Figure 6:
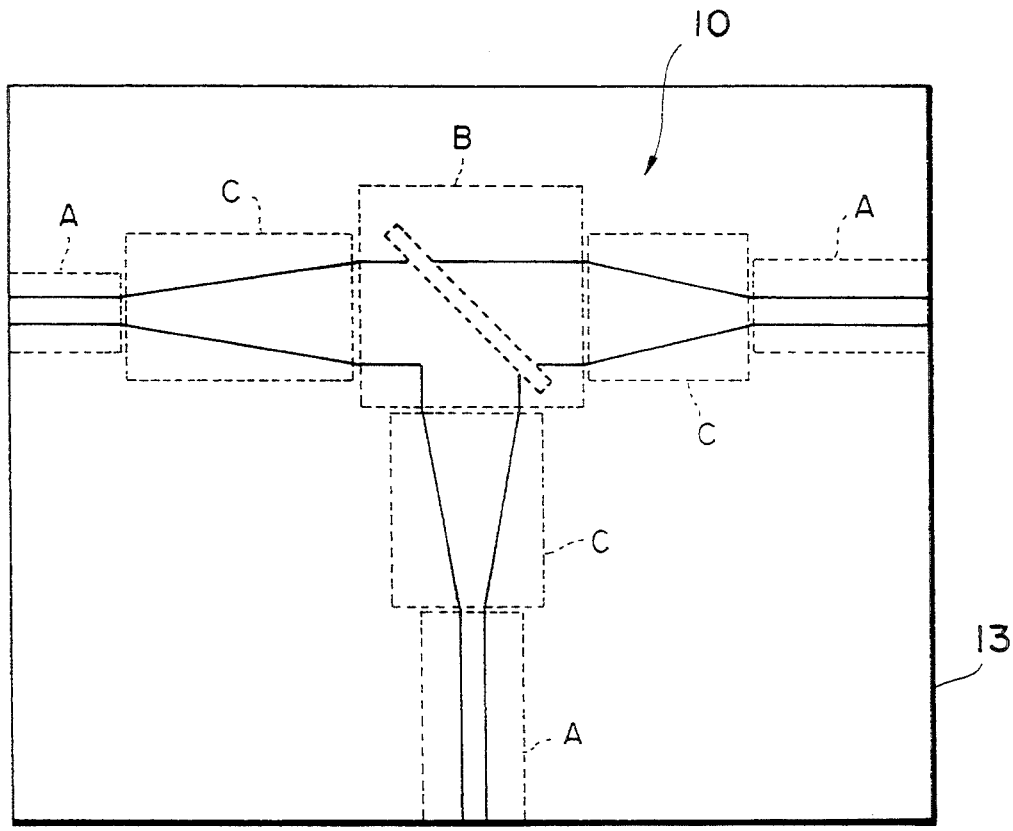
FIG. 6 is a view for explaining the respective regions of the optical waveguide device shown in FIG. 5 that constitute the optical waveguide.

As shown in FIG. 6, the optical waveguide 10 is constituted by at least three types of regions A, B, and C.

The region A is an optical waveguide region having at least two input/output terminals, the region A adapted to be a light transmission path.

The region B is a region having at least one input/output terminal of propagating light. This region is an insertion region possibly adapted to be inserted an optical functional component for realizing a predetermined function. The mode field width of light propagating in the region B is larger than that of light at a predetermined portion of the optical waveguide region.

The region C is a region having a first input/output terminal directly connected to one input/output terminal of the optical waveguide region and a second input/output terminal directly connected to the input/output terminal of the insertion region. This region C is a first optical connection region for varying the mode field width of light propagating in it.

Figure 7:
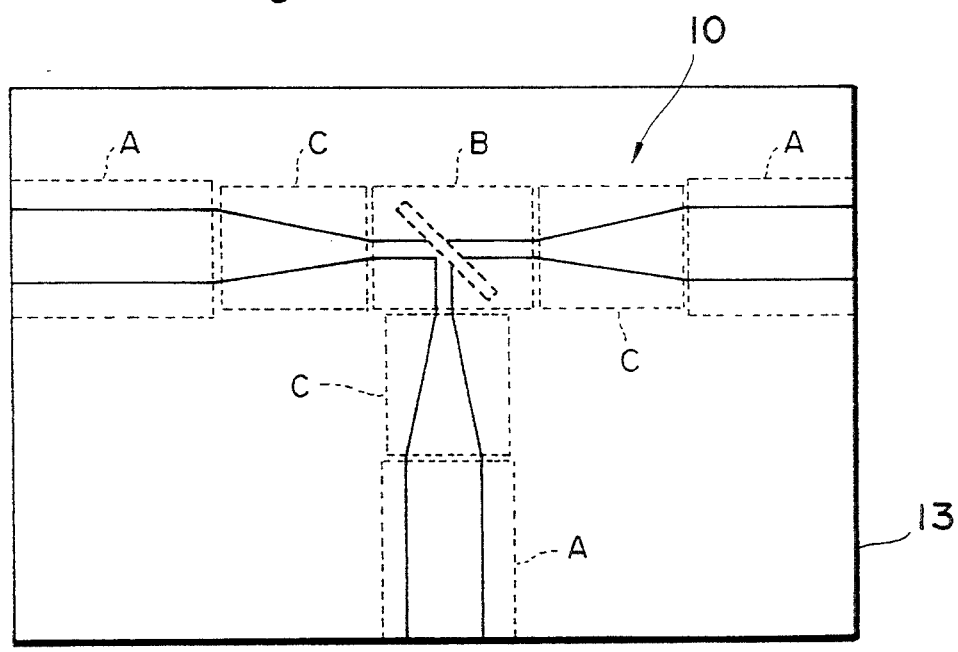
FIG. 7 is a view for explaining the respective regions of an optical waveguide device equivalent to that shown in FIG. 5 constitutes the optical waveguide.

Each of the optical waveguide devices shown in FIGS. 5, 6, and 7 has a structure for changing the mode field width of propagating light by continuously changing the core width of the first connection region C.

In particular, the optical waveguide 10 formed on the waveguide substrate can be fabricated in accordance with sputtering, CVD, flame deposition, or the like. When a quartz-based optical waveguide is to be formed, flame deposition is effective since it decreases losses. The manufacturing process of the $SiO_2$—$TiO_2$ optical waveguide 10 in accordance with flame deposition is disclosed in "Small-Loss Quartz-Based Optical Waveguide" in Optoronics (1992) No. 6, which will be summarized as follows.

More specifically, fine glass particles obtained by burning a gas mixture material of $SiCl_4$ and $TiCl_4$ in oxyhydrogen flame are deposited on an Si substrate (waveguide substrate) 11. The composition of the fine glass particles is controlled in this flame deposition process, thereby forming a two-layered fine particle film consisting of an $SiO_2$ lower cladding layer (a layer serving as the prospective cladding layer of the optical waveguide 10) and an $SiO_2$—$TiO_2$ core layer (serving as the core of the optical waveguide 10).

Subsequently, this two-layered fine particle film (the $SiO_2$ lower cladding layer and the $SiO_2$—$TiO_2$ core layer) is heated to a high temperature of 1,000° C. or more in an electric furnace to form a transparent planar optical waveguide film. Then, an unnecessary glass film portion is removed by reactive ion etching, thereby forming a ridge-shaped core.

Finally, the core is covered with an $SiO_2$ upper cladding layer in accordance with the flame deposition process again and changed into a transparent glass layer to form a cladding layer that constitutes the optical waveguide 10, thereby manufacturing the optical waveguide device.

In the embodiment shown in FIG. 5, of incident-(incident side of the functional component), transmission-, and reflection-side (which are both on the reflection side of the functional component) optical waveguides 10a, 10b, and 10c, the width of the core of each connection region C is increased in the tapered manner toward the T-shaped insertion region (insertion region having three input/output terminals) of the functional component.

Figure 8:
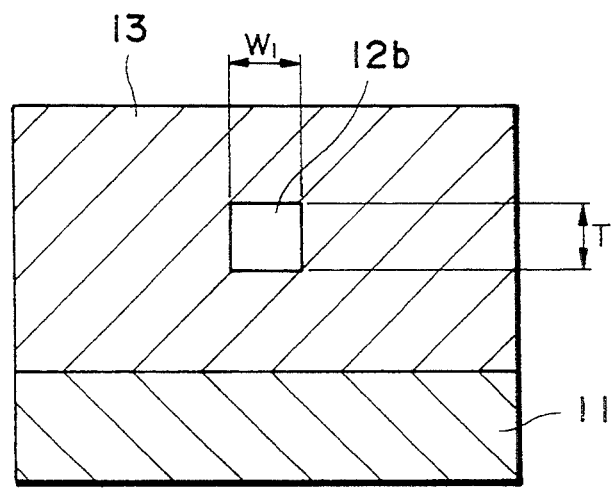
FIG. 8 is a sectional view of an optical waveguide region A taken along the line X—X of the optical waveguide device shown in FIG. 5 and of an optical waveguide device shown in FIG. 15.
Figure 9:
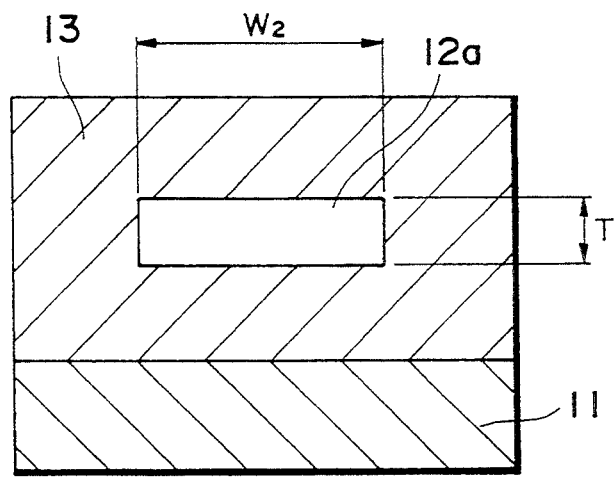
FIG. 9 is a sectional view of the optical waveguide region A taken along the lines Y—Y and Z—Z of the optical waveguide devices shown in FIGS. 5 and 15.

On the other hand, in the embodiment shown in FIG. 7, of incident- (incident side of the functional component), transmission-, and reflection-side (which are both on the reflection side of the functional component) optical waveguides 10a, 10b, and 10c, the width of the core of each connection region C is decreased in the tapered manner toward the T-shaped insertion region (insertion region having three input/output terminals) of the functional component. A core width $W_1$ at a portion of the optical waveguide before widened in the tapered manner, e.g., of the optical waveguide region A is, e.g., 7 $\mu$m. More specifically, this corresponds to the core width of the portion 12b indicated by the line X—X in FIG. 5. FIG. 8 shows the sectional view of the portion of this optical waveguide. A core width $W_2$ at the insertion region B is, e.g., 20 $\mu$m. More specifically, this corresponds to the core width of the portion 12a indicated by the line Y—Y in FIG. 5. FIG. 9 shows the sectional view of the insertion region B. The length of the first optical connection region C where the core width is gradually changed with a predetermined taper angle with respect to the optical axis, i.e., a taper length L is 2 mm. A thickness T of the core 12a or 12b is constantly 7 $\mu$m, and the refractive index difference between the core 12a or 12b and the cladding layer 13 is 0.3%.

The half mirror 2 is inserted in the insertion region B which is formed to have a T shape in the optical waveguide 10. The half mirror 2 is mounted at an angle of 45° with respect to the optical axis of the incident light propagating through the incident-side optical waveguide 10a. The half mirror 2 can be mounted in accordance with various manners. Generally, a groove for inserting the half mirror is formed at a corresponding portion of the insertion region B of the optical waveguide 10 by an appropriate means, e.g., a laser beam process, chemical etching, mechanical cutting, or the like. Thereafter, the half mirror 2 is inserted in the formed groove.

In particular, the half mirror 2 of this embodiment has a thickness of 15 $\mu$m and vertical and horizontal sides of 1 mm. This half mirror 2 is designed to transmit 50% and to reflect 50% of light having a wavelength 1.31 $\mu$m.

In the above arrangement, the core width of the core 12b in the optical waveguide region A is 7 $\mu$m and its mode field width is about 8 $\mu$m. The width of the core 12a at the input/output terminal of the insertion region B in the vicinity of the half mirror 2 is 20 $\mu$m. Accordingly, when light having a wavelength of 1.31 $\mu$m becomes incident on the incident-side optical waveguide 10a, the mode field of this light is enlarged in the horizontal direction as this light comes close to the half mirror 2 in the first optical connection region C. When light is incident on the insertion region B, 50% of the incident light is guided to the transmission-side optical waveguide 10b and the remaining 50% of the incident light is guided to the reflection-side optical waveguide 10c by the half mirror 2.

Figure 2:
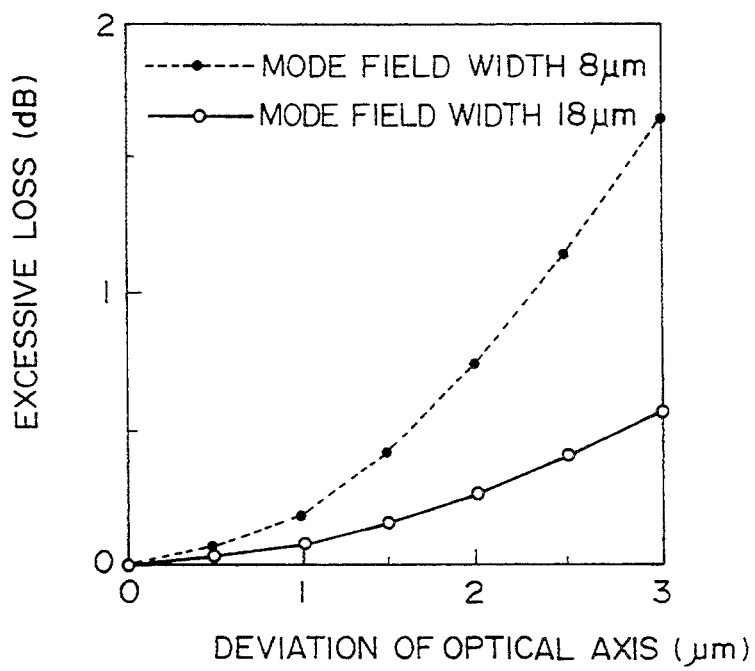
FIG. 2 is a graph showing the relationship between the deviation of the optical axis, when an optical functional component is inserted in an insertion region, and an optical excessive loss in each of two types of optical waveguides having different mode field widths.
Figure 10:
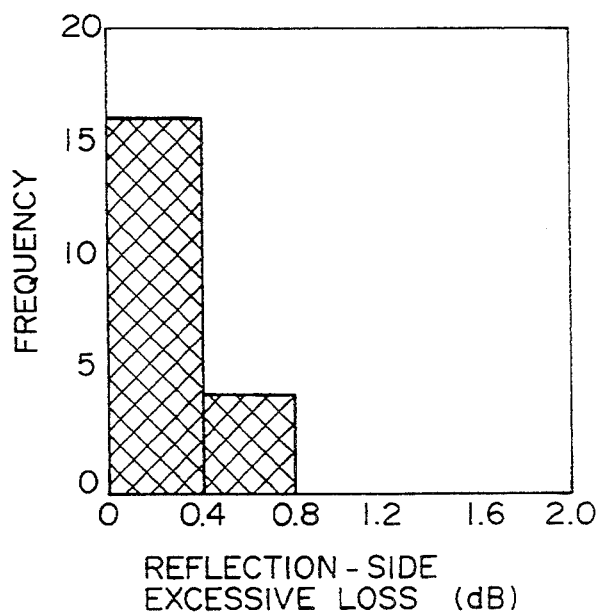
FIG. 10 is a graph showing the loss frequency distribution of the optical waveguide device (20 samples) shown in FIG. 5.
Figure 11:
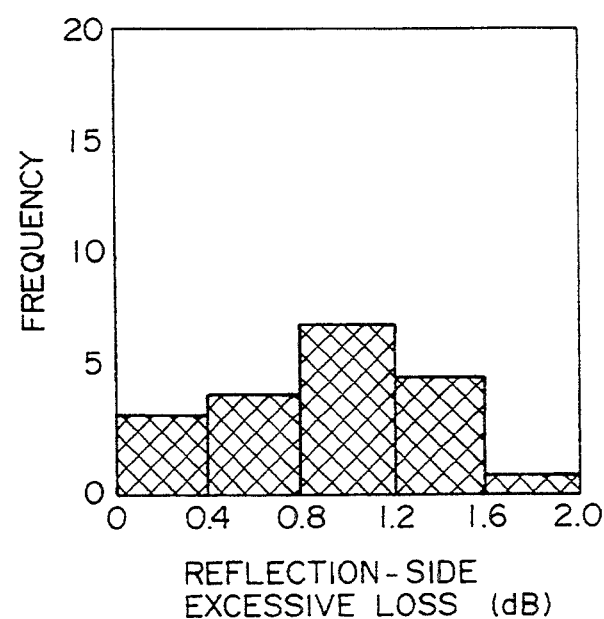
FIG. 11 is a graph showing the loss frequency distribution of the conventional optical waveguide device (20 samples) shown in FIG. 1.

At this time, a case will be studied wherein the insertion position of the half mirror 2 in the insertion region B has a poor precision and thus the optical axes of the transmission and reflected light are deviated. In this case, since the mode field width is increased, light is propagated to the respective optical waveguides 10b and 10c with a small loss in the manner described above with reference to FIG. 2. FIGS. 10 and 11 are employed to confirm this loss decreasing effect.

More specifically, FIG. 10 is a graph of the loss frequency distribution which evaluates an excessive loss in the reflection-side optical waveguide 10c obtained with 20 optical waveguide devices each having the above arrangement. FIG. 11 is a graph of the loss frequency distribution of the conventional optical waveguide device having a constant core width of 7 $\mu$m while other conditions being set to be the same as those of the above arrangement.

The excessive loss is supposed to be caused mainly by the misalignment of the optical axis of the reflected light and the center of the core 12a of the reflection-side optical waveguide 10c due to the poor precision of the insertion position of the half mirror 2 in the manufacturing process. As is apparent from comparison of FIGS. 10 and 11, in the optical waveguide device according to the present invention, the excessive loss is smaller than that of the conventional optical waveguide device, and repeatability of the optical excessive loss is improved as well. That is, the optical waveguide device according to the present invention is less influenced by the poor insertion precision.

Figure 3:
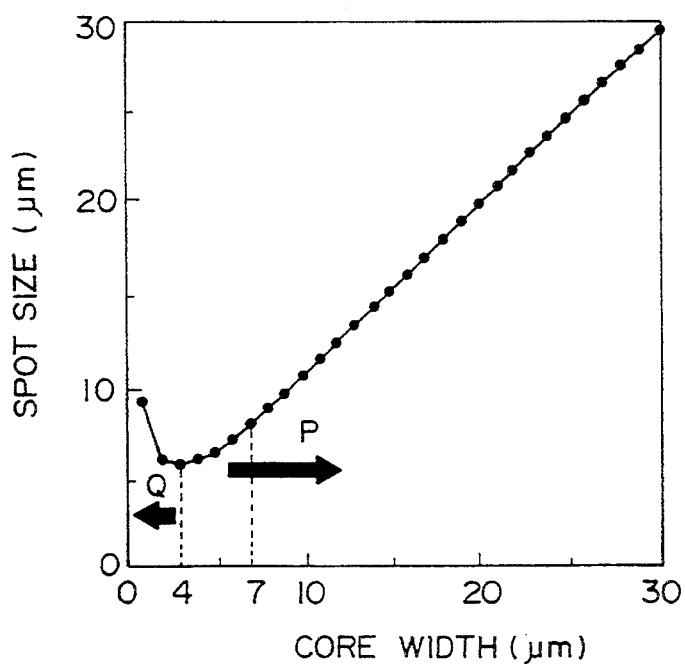
FIG. 3 is a graph showing the relationship between the core width and the mode field width of an optical waveguide having a constant core thickness.

In the above embodiment, the mode field width is increased by increasing the width of the core 12a at a portion corresponding to one input/output terminal of the insertion region B, where the half mirror 2 is to be inserted, to be larger than the width of the core 12b of the optical waveguide region A. As described above, however, the mode field width can be increased also by decreasing the core width. When the core width is 7 μm in the same manner as in the above embodiment, the mode field width can be increased by decreasing the width of the core 12a at one input/output terminal of the insertion region B, where the half mirror 2 is to be inserted, to 2 μm or less. In this case as well, the excessive loss can be decreased in the same manner as in the case wherein the core width is increased (the range Q shown in FIG. 3).

Figure 4:
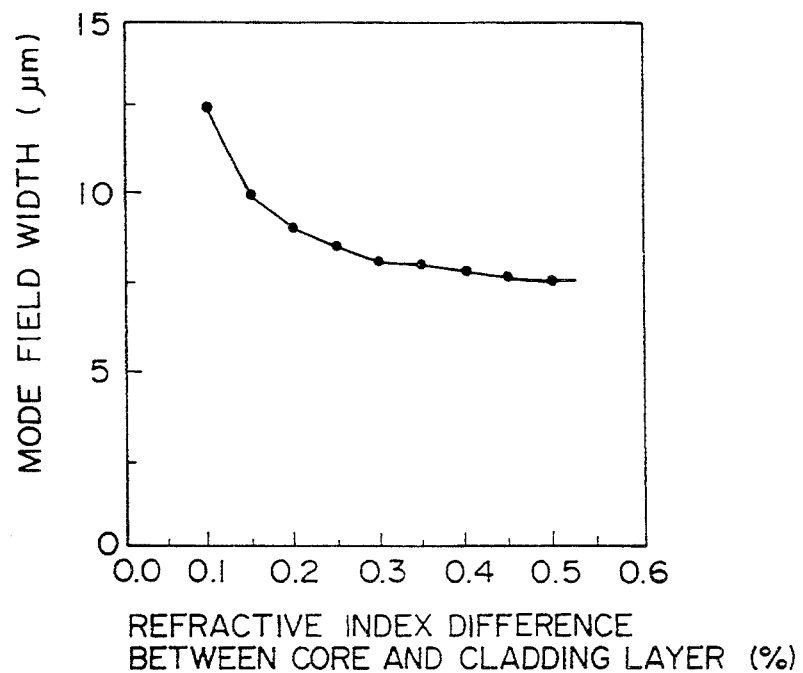
FIG. 4 is a graph showing the relationship between the refractive index difference between the core and a cladding layer covering the core, and the mode field width of light propagating in the optical waveguide.

Even when the core width is constant, the mode field width can be increased by decreasing the refractive index difference between the core 12a and the cladding layer 13 at one input/output terminal of the insertion region B to be smaller than the refractive index difference between the core 12b and the cladding layer 13 of the optical waveguide region A (FIG. 4). To locally decrease the difference in specific refractive index, the refractive index of the core 12a at the insertion region B may be locally decreased. More specifically, in the case of the above embodiment, the refractive index can be decreased by diffusing $TiO_2$ in the $SiO_2$—$TiO_2$ core 12a into the surrounding cladding layer 13.

In the above embodiment, the $SiO_2$—$TiO_2$ optical waveguide is shown as the optical waveguide 10. Other than this, an $SiO_2$—$GeO_2$ optical waveguide can also be used as a small-loss optical waveguide. When the $SiO_2$—$GeO_2$ optical waveguide is used, in order to decrease the refractive index of the core, $GeO_2$ is diffused from a desired portion in the optical waveguide.

The optical waveguide device in which the half mirror 2 is inserted in the T-shaped insertion region B of the optical waveguide 10 in order to provide the optical branching function has been described. The present invention is not limited to this specific embodiment but can also be applied to other optical waveguide devices that perform optical switching, coupling, and the like.

Figure 12:
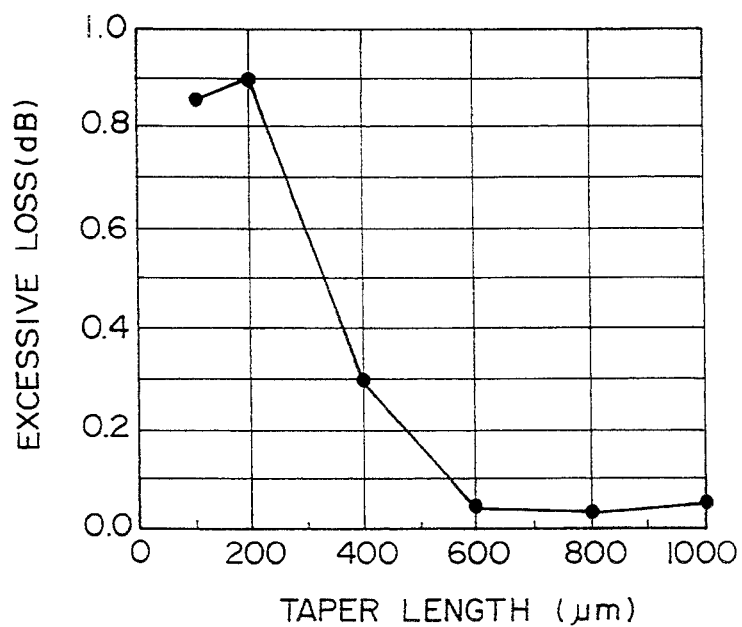
FIG. 12 is a graph showing the relationship between the length (taper length) of a connection region C, seen along the traveling direction of light propagating through the optical waveguide, and an excessive loss in the optical waveguide device according to the present invention.

The relationship between the taper length L (the length of the connection region B seen along the traveling direction of light) and the excessive loss of a case wherein the core width of the optical waveguide is changed in a tapered manner (the core width is gradually increased or decreased) as 7 μm→20 μm→7 μm is obtained by calculation. FIG. 12 shows data concerning an optical waveguide in which an optical waveguide region A, a first optical connection region C, an insertion region B, a first optical connection region C, and an optical waveguide region A are connected in series in the above manner.

As is apparent from FIG. 12, when the taper length is 600 μm or more, sufficient loss reduction can be achieved.

Figure 13:
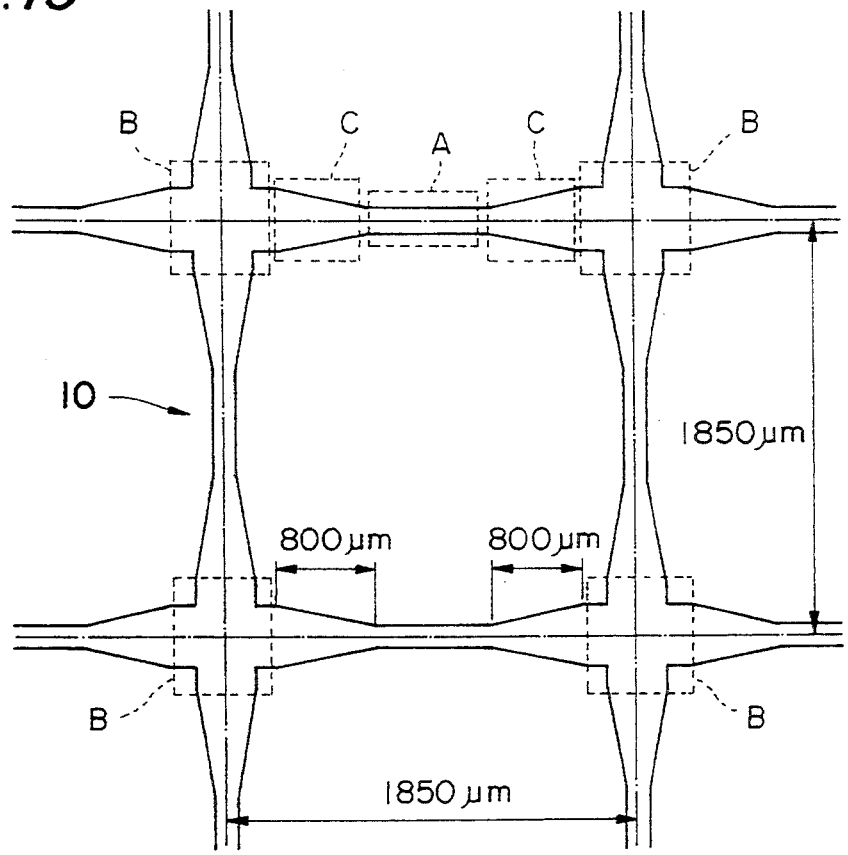
FIG. 13 is a view showing the structure of an optical waveguide type switch as a comparative example of the optical waveguide device shown in FIG. 15.

However, from the above effect, when the first optical connection regions C (800 μm in the above embodiment) having a length (taper length) of 600 μm or more are directly connected to the four input/output terminals (the incident and exit sides of the functional component) of the insertion region B, and four insertion regions B each having such an arrangement are formed in a matrix manner as an optical waveguide, an optical waveguide type switch in which mirrors are inserted in the respective insertion regions B at an angle of 45° with respect to the optical axis of the incident light is constituted. In the optical waveguide device having this arrangement, as shown in FIG. 13, two first optical connection regions C and one optical waveguide region A are present between each pair of the insertion regions B, so that the size of the optical waveguide device is increased accordingly. An optical waveguide type switch capable of linearly transmitting light or changing the traveling path of light can be manufactured by mounting the half mirrors 2, although not shown in FIG. 13, in the respective insertion regions B to be inclined at an angle of 45° with respect to the optical axes of light propagating through the corresponding optical waveguides 10, or by removing the mirrors 2.

The present invention can also be applied to an optical waveguide device in which a filter is inserted in the optical waveguide for the purpose of selecting the wavelength of light. When a filter is inserted, an off-axis excessive loss is rarely caused. However, since an excessive loss caused by the refractive index difference between the groove, formed for inserting the filter, and the optical waveguide can be decreased by increasing the mode field width, the present invention can be applied to this optical waveguide device.

Figure 14:
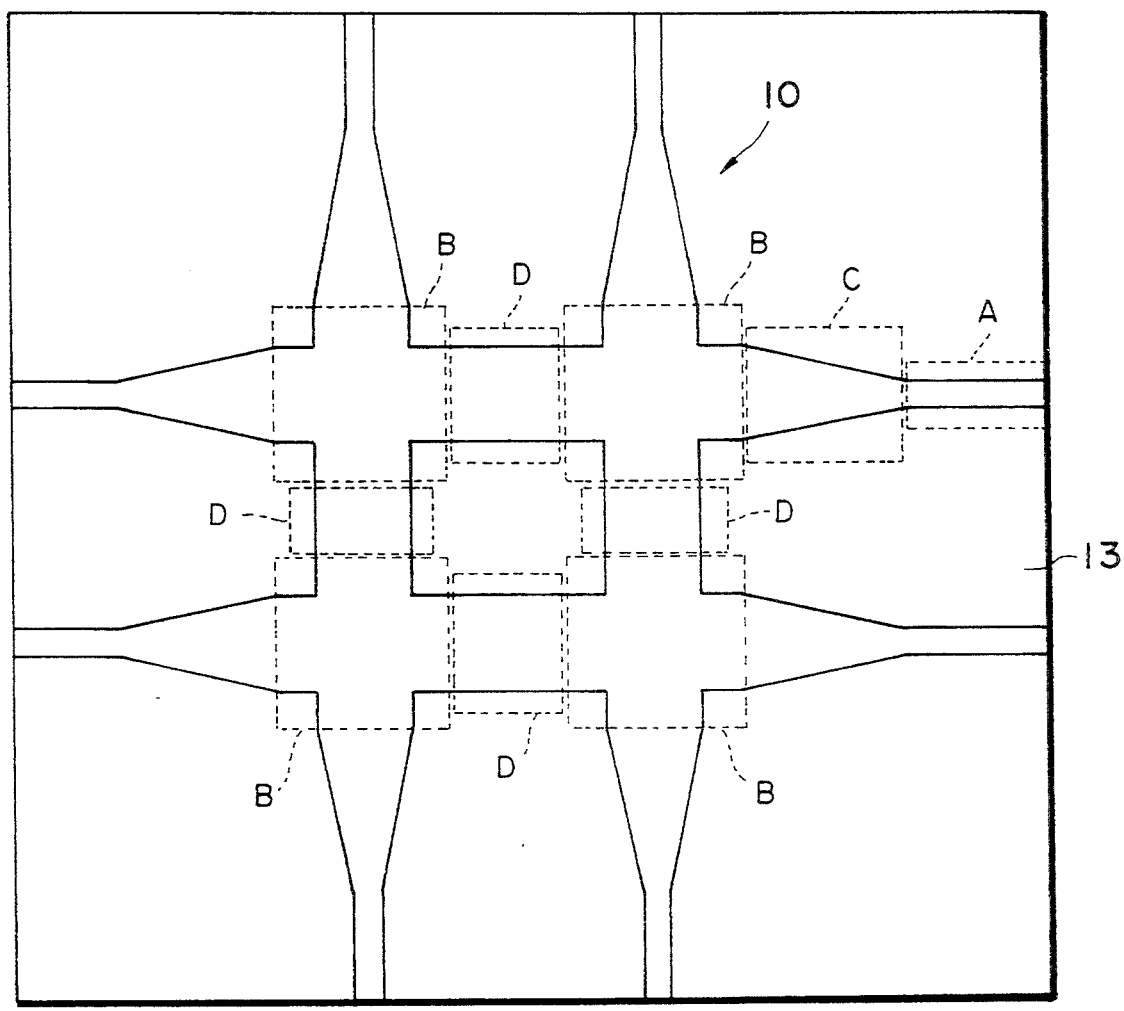
FIG. 14 is a view for explaining the respective regions constituting an optical waveguide in an application of the optical waveguide device according to the present invention.
Figure 15:
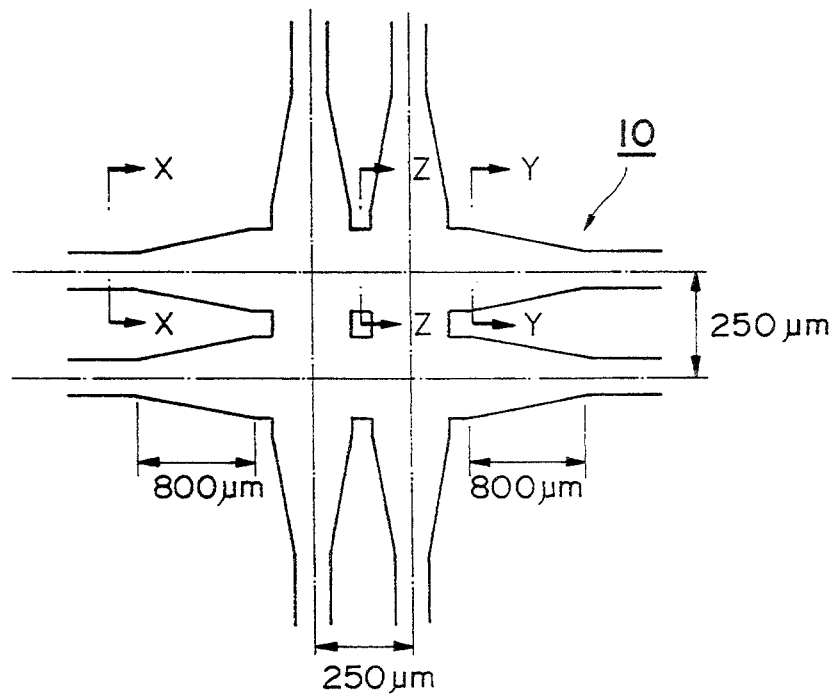
FIG. 15 is a view showing the arrangement of an optical waveguide type switch as an application of the optical waveguide device according to the present invention.

As an application of the optical waveguide device according to the present invention, an optical waveguide device for performing above-described optical switching, coupling, and the like which is constituted by a plurality of insertion regions B will be described (FIGS. 14 and 15).

As described above, the optical waveguide according to the present invention is formed by changing the core width in each region such that the mode field width of light propagating in each insertion region B becomes larger than that of light propagating in the corresponding optical waveguide region A. Accordingly, for the purpose of preventing an increase in excessive loss with an abrupt change in core width, the first optical connection regions C whose core width is gradually changed from the first to second input/output terminal are provided between insertion regions B and optical waveguide regions A.

FIG. 14 shows an application of the optical waveguide device according to the present invention. Note that the insertion regions B and the first optical connection regions C may have a structure shown in FIG. 7.

Referring to FIG. 14, each optical waveguide 10 has an optical waveguide region A having at least two input/output terminals, the region A adapted to be a light transmission path to provide a predetermined mode field width to light. Each optical waveguide 10 also has an insertion region B which is a region having at least one input/output terminal of light, the region B possibly adapted to be inserted an optical functional component for realizing a predetermined function. The mode field width of light propagating in the insertion region B is larger than that of light propagating at a predetermined portion of the optical waveguide region A. Each optical waveguide 10 also has a first optical connection region C having a first input/output terminal directly connected to one input/output terminal of the optical waveguide region A and a second input/output terminal directly connected to the input/output terminal of the insertion region B for changing the mode field width of light propagating in this region.

Furthermore, this optical waveguide 10 has a second optical connection region D having a first input/output terminal directly connected to the input/output terminal of one insertion region B and a second input/output terminal directly connected to the input/output terminal of the other insertion region B. The core sizes of the first and second input/output terminals of the second optical connection region D are equal to the core sizes of the input/output terminals of the corresponding insertion regions B to which the second optical connection region D is connected. Therefore, the mode field width of light propagating in the insertion regions B is also equal to that of light propagating in the second optical connection region D.

More specifically, as shown in FIG. 15, the core width of the first optical connection regions C is increased before propagating light passes through the plurality of insertion regions B. That is, while the mode field width of light once increased is maintained by the second optical connection regions D, the propagating light is passed through the plurality of insertion regions B. Then, the mode field width is returned to the original size by the first optical connection regions C. With this arrangement, downsizing of the optical waveguide device and an increase in integration degree of the optical functional components are achieved.

In order to confirm the effect of the above optical waveguide device (FIG. 15) according to the present invention, the present inventors made an optical waveguide device on an experimental basis invention as follows.

(1) An optical waveguide type switch as a first comparative example, as shown in FIG. 13, which is fabricated by forming four insertion regions B in a matrix manner and disposing an optical waveguide region A and a first optical connection regions C between each pair of insertion regions B. In this optical waveguide device (first comparative example), the refractive index difference between the core and the cladding layer is 0.3%, and the core width is 7 $\mu$m. The core width of the optical waveguide region A is 7 $\mu$m. The core width of the insertion regions B is 20 $\mu$m. The length of the first optical connection regions C for changing the core width from 7 $\mu$m to 20 $\mu$m or vice versa, i.e., the taper length L, is 800 $\mu$m, and the distance between the core centers of each pair of insertion regions B is 1,850 $\mu$m.

(2) An optical waveguide type switch which is made as an application of the optical waveguide device according to the present invention, as shown in FIG. 15. In this optical waveguide device, the refractive index difference between the core and the cladding layer is 0.3%, and the core width is 7 $\mu$m. The four insertion regions B are formed in a matrix manner. The core width of each second optical connection region D disposed between each pair of insertion regions B is 20 $\mu$m, which is the same as that of each insertion region B. The length of the first optical connection regions C for changing the core width from 7 $\mu$m to 20 $\mu$m or vice versa, i.e., the taper length L, is 800 $\mu$m, and the distance between the core centers of each pair of insertion regions B is 250 $\mu$m. Note that the sizes of the respective portions in FIGS. 13 and 15 and corresponding indicated values are not necessarily disclosed in the same proportion.

Figure 16:
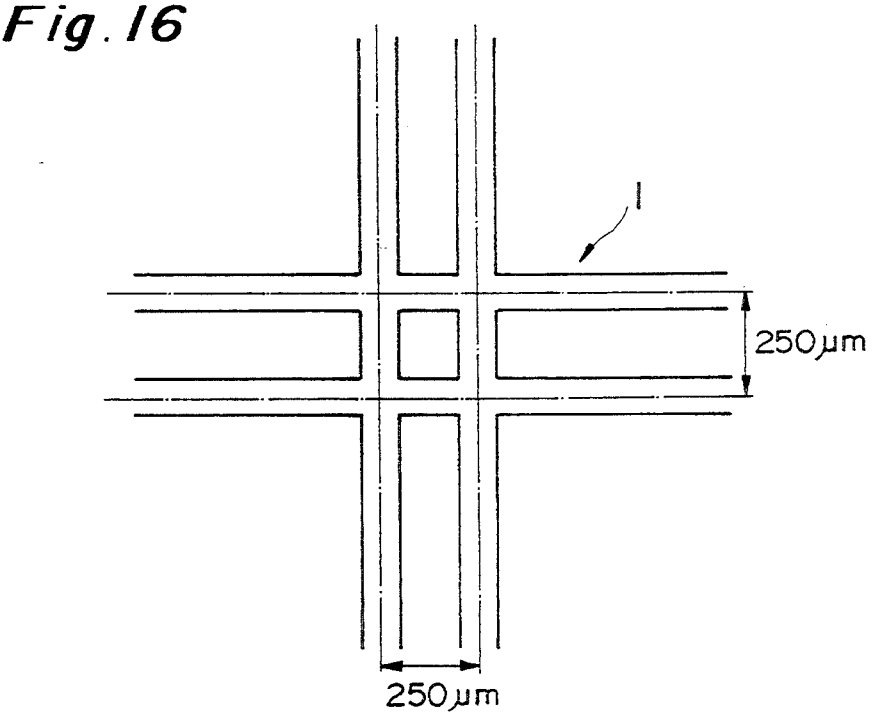
FIG. 16 is a view showing the structure of an optical waveguide type switch as a conventional optical waveguide device to be compared with the optical waveguide device shown in FIG. 15.

(3) An optical waveguide switch as a second comparative example which is formed as a conventional optical waveguide device, as shown in FIG. 16. In this conventional optical waveguide device (second comparative example), the refractive index difference between the core and the cladding layer of the optical waveguide is 0.3%, and the core width is constantly 7 $\mu$m. The distance between the core centers of the intersecting portions of an optical waveguide 1 is 250 $\mu$m.

Figure 17:
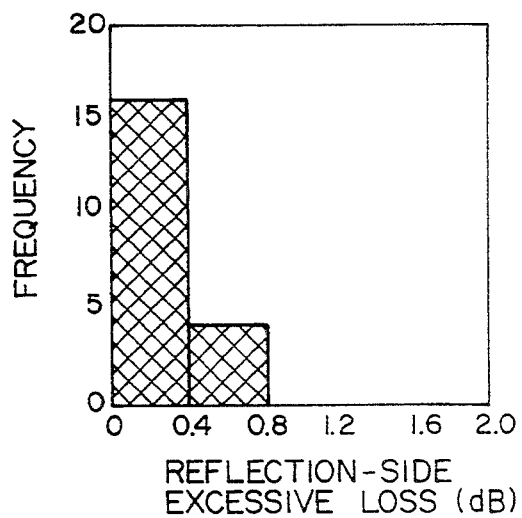
FIG. 17 is a graph showing the loss frequency distribution of the optical waveguide device (20 samples) shown in FIG. 13.
Figure 18:
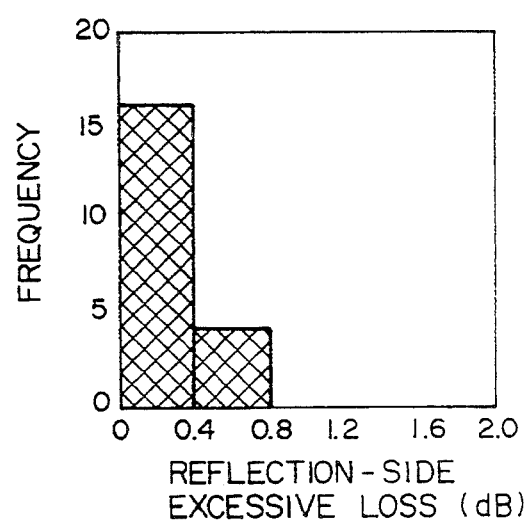
FIG. 18 is a graph showing the loss frequency distribution of the optical waveguide device (20 samples) shown in FIG. 15.
Figure 19:
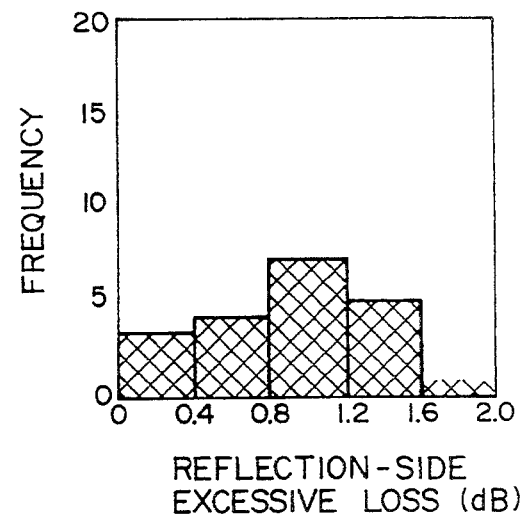
FIG. 19 is a graph showing the loss frequency distribution of the conventional optical waveguide device (20 samples) shown in FIG. 16.

Twenty optical waveguide device samples that serve as optical switches for light having a wavelength of 1.31 $\mu$m were fabricated for each of three types of optical waveguide devices, and the excessive loss on the reflection side was evaluated. FIGS. 17 to 19 show the results.

FIG. 17 is a graph showing the excessive loss frequency distribution of the first comparative example. FIG. 18 is a graph showing the excessive loss frequency distribution of the optical waveguide device according to the present invention. FIG. 19 is a graph showing the excessive loss frequency distribution of the second comparative example (conventional optical waveguide device shown in FIG. 16).

The excessive loss is supposed to be caused mainly by the misalignment of the optical axis of the reflected light and the center of the core of the reflection-side optical waveguide due to the poor precision of the insertion position of the half mirror. As is apparent from FIGS. 17 to 19, when the optical waveguide device of the first comparative example and that according to the present invention (FIG. 15) were compared with that of the second comparative example (conventional optical waveguide device), it was confirmed that the optical waveguide 10 having a tapering core at the insertion region B where the mirror 2 (optical functional component) is to be inserted had a smaller excessive loss than that of the optical waveguide 1 (second comparative example) having a constant core width, and that repeatability of the excessive loss was improved as well.

When the first comparative example was compared with the optical waveguide device according to the present invention, it was confirmed that the latter had a similar small loss although its size was greatly smaller than the former. In other words, the optical waveguide device shown in FIG. 14 can provide the same effect as that of the first comparative example while it is capable of downsizing.

Other examples (applicable embodiments) of the optical waveguide device shown in FIG. 5 described above can be applied to the optical waveguide device shown in FIG. 15.

As has been described above, according to the present invention, in order to increase the mode field width of the insertion region, where a functional component, e.g., a mirror, is to be inserted, of an optical waveguide to be larger than the mode field width of the optical waveguide region, a connection region is provided in tight contact between the insertion region and the optical waveguide region, thereby realizing a desired function. Therefore, a transmission loss caused by insertion of the functional component can be decreased as compared to that of the conventional optical waveguide device.

Furthermore, according to the application of the present invention, the same effect as described above can be obtained, and the optical waveguide device can be further downsized than that of the present invention described above. These optical waveguide devices can be used as optical devices that are useful in downsizing and in improving the functions of an optical communication system, an optical sensor, and the like. As a result, an optical waveguide device which can be sufficiently manufactured on a mass production basis without requiring high precision can be provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical waveguide device comprising:
   a waveguide substrate; and
   an optical waveguide disposed on said waveguide substrate and formed from a core for propagating light therein and a cladding layer covering said core, said optical waveguide including:
      an optical waveguide region having at least two input/output terminals;
      an insertion region having at least one input/output terminal and a mode field width of light propagating therein larger than that of light propagating at a predetermined portion of said optical waveguide region, said insertion region being constructed and arranged for allowing an optical functional component to be inserted therein for performing a predetermined function; and
      a first optical connection region for changing a mode field width of light propagating therein, said first optical connection region having a first input/output terminal directly connected to one of said at least two input/output terminals of said optical waveguide region and a second input/output terminal directly connected to one of said at least one input/output terminal of said insertion region,
   wherein said first input/output terminal of said first optical connection region has the same core size as that of said input/output terminal of said optical waveguide region connected thereto,
   wherein said second input/output terminal of said first optical connection region has the same core size as that of said input/output terminal of said insertion region connected thereto, and
   wherein said core size of said second input/output terminal of said first optical connection region is smaller than said core size of said first input/output terminal of said first optical connection region and is smaller than a core size that minimizes a mode field width of light propagating in said first optical connection region.

2. A device according to claim 1, wherein said first optical connection region has a core of a sectional shape which is tapered, in a horizontal direction with respect to a main surface of said waveguide substrate, toward a direction from said first to second input/output terminal thereof at a predetermined taper angle with respect to an optical axis of said core.

3. An optical waveguide device comprising:
   a waveguide substrate; and
   an optical waveguide disposed on said waveguide substrate and formed from a core for propagating light therein and a cladding layer covering said core, said optical waveguide including:
      an optical waveguide region having at least two input/output terminals;
      an insertion region having at least one input/output terminal and a mode field width of light propagating therein larger than that of light propagating at a predetermined portion of said optical waveguide region, said insertion region being constructed and arranged for allowing an optical functional component to be inserted therein for performing a predetermined function; and
      a first optical connection region for changing a mode field width of light propagating therein, said first optical connection region having a first input/output terminal directly connected to one of said at least two input/output terminals of said optical waveguide region and a second input/output terminal directly connected to one of said at least one input/output terminal of said insertion region,
   wherein a refractive index difference between a core and a cladding layer in a region including said insertion region and said first optical connection region is smaller than a refractive index difference between a core and a cladding layer at a predetermined portion of said optical waveguide region.

4. A device according to claim 3, wherein a refractive index difference between a core and a cladding layer in said first optical connection region continuously decreases in a direction from said first to second input/output terminal thereof.

5. An optical waveguide device comprising:
   a waveguide substrate;
   an optical waveguide disposed on said waveguide substrate and formed from a core for propagating light therein and a cladding layer covering said core, said optical waveguide including:
      an optical waveguide region having at least two input/output terminals;
      a first insertion region having at least two input/output terminals and a mode field width of light propagating therein larger than that of light propagating at a predetermined portion of said optical waveguide region, said first insertion region being constructed and arranged for allowing an optical functional component to be inserted therein for performing a predetermined function; and
      a first optical connection region for changing a mode field width of light propagating therein, said first optical connection region having a first input/output terminal directly connected to one of said at least two input/output terminals of said optical waveguide region and a second input/output terminal directly connected to a first of said at least two input/output terminals of said first insertion region; and
      a second optical connection region having a first input/output terminal directly connected to a second of said at least two input/output terminals of said first insertion region and a second input/output terminal directly connected to an input/output terminal of a second insertion region,
   wherein a mode field width of light propagating in said second optical connection region is equal to that of light propagating in said first and second insertion regions to which said second optical connection region is connected.

6. A device according to claim 5, wherein said first and second input/output terminals of said second optical connection region have core sizes equal to core sizes of said input/output terminals of said first and second insertion regions to which said second optical connection region is connected, said core sizes of said input/output terminals of said first and second insertion regions to which said second optical connection region is connected being larger than a core size at a predetermined portion of said optical waveguide region.

7. A device according to claim 6, wherein said first insertion region to which said second optical connection region is connected has at least one input/output terminal connected to said second input/output terminal of said first optical connection region, said first optical connection region having a core of a sectional shape which is tapered, in a horizontal direction with respect to a main surface of said waveguide substrate, toward a direction from said second to first input/output terminal thereof at a predetermined taper angle with respect to an optical axis of said core.

8. A device according to claim 5, wherein said first and second input/output terminals of said second optical connection region have core sizes equal to core sizes of said input/output terminals of said first and second insertion regions to which said second optical connection region is connected, said core sizes of said first and second insertion regions to which said second optical connection region is connected being smaller than a core size at a predetermined portion of said optical waveguide region and smaller than a core size that minimizes a mode field width of light propagating in said first and second insertion regions to which said second optical connection region is connected.

9. A device according to claim 8, wherein said insertion region to which said second optical connection region is connected has at least one input/output terminal connected-to said second input/output terminal of said first optical connection region, said first optical connection region having a core of a sectional shape which is tapered, in a horizontal direction with respect to a main surface of said waveguide substrate, toward a direction from said first to second input/output terminal thereof at a predetermined taper angle with respect to an optical axis of said core.

10. A device according to claim 5, wherein a refractive index difference between a core and a cladding layer in said second optical connection region is equal to a refractive index difference between a core and a cladding layer in said first insertion region to which said second optical connection region is connected, and smaller than a refractive index difference between a core and a cladding layer at a predetermined portion of said optical waveguide region.

11. A device according to claim 10, wherein said first insertion region to which said second optical connection region is connected has at least one input/output terminal connected to said second input/output terminal of said first optical connection region, a refractive index difference between a core and a cladding layer in said first optical connection region continuously decreases in a direction from said first to second input/output terminal thereof.

12. An optical waveguide device comprising:
a waveguide substrate;
an optical waveguide disposed on said waveguide substrate and formed from a core for propagating light therein and a cladding layer covering said core, said optical waveguide including:
an optical waveguide region having at least two input/output terminals;
a first insertion region having at least two input/output terminals, a core size of which is larger than a core size at a predetermined portion of said optical waveguide region, said first insertion region being constructed and arranged for allowing an optical functional component to be inserted therein for performing a predetermined function;
a first optical connection region having a first input/output terminal directly connected to one of said at least two input/output terminals of said optical waveguide region and a second input/output terminal directly connected to a first of said at least two input/output terminals of said first insertion region, said first input/output terminal of said first optical connection region having a core size which is equal to a core size of said input/output terminal of said optical waveguide region connected thereto, and said second input/output terminal of said first optical connection region having a core size which is equal to a core size of said input/output terminal of said first insertion region connected thereto; and
a second optical connection region having a first input/output terminal directly connected to a second of said at least two input/output terminals of said first insertion region and a second input/output terminal directly connected to an input/output terminal of a second insertion region, said first and second input/output terminals of said second optical connection region having core sizes equal to core sizes of said input/output terminals of said first and second insertion regions to which said second optical connection region is connected.

13. An optical waveguide device comprising:
a waveguide substrate; and
an optical waveguide disposed on said waveguide substrate and formed from a core for propagating light therein and a cladding layer covering said core, said optical waveguide including:
an optical waveguide region having at least two input/output terminals and a desired core size at a predetermined portion;
a first insertion region having at least one input/output terminal, a core size of which is smaller than a core size of said optical waveguide region, said first insertion region being constructed and arranged for allowing an optical functional component to be inserted therein for performing a predetermined function; and
a first optical connection region having a first input/output terminal directly connected to one of said at least two input/output terminals of said optical waveguide region and having the same core size as that of said input/output terminal of said optical waveguide region connected thereto, said first optical connection region further having a second input/output terminal directly connected to a first of said at least one input/output terminal of said first insertion region and having the same core size as that of said input/output terminal of said first insertion region connected thereto,
wherein said core size of said second input/output terminal of said first optical connection region is smaller than said core size of said first input/output terminal of said first optical connection region and is smaller than a core size that minimizes a mode field width of light propagating in said first connection region.

14. A device according to claim 13, wherein said first optical connection region has a core of a sectional shape which is tapered, in a horizontal direction with respect to a main surface of said waveguide substrate, toward a direction from said first to second input/output terminal thereof at a predetermined taper angle with respect to an optical axis of said core.

15. An optical waveguide device comprising:
a waveguide substrate; and
an optical waveguide disposed on said waveguide substrate and formed from a core for propagating light therein and a cladding layer covering said core, said optical waveguide including:
   an optical waveguide region having at least two input/output terminals and a desired core size at a predetermined portion;
   a first insertion region having at least one input/output terminal, a core size of which is smaller than a core size of said optical waveguide region, said first insertion region being constructed and arranged for allowing an optical functional component to be inserted therein for performing a predetermined function; and
   a first optical connection region having a first input/output terminal directly connected to one of said at least two input/output terminals of said optical waveguide region and having the same core size as that of said input/output terminal of said optical waveguide region connected thereto, said first optical connection region further having a second input/output terminal directly connected to a first of said at least one input/output terminal of said first insertion region and having the same core size as that of said input/output terminal of said first insertion region connected thereto,
   wherein said core size of said second input/output terminal of said first optical connection region is smaller than said core size of said first input/output terminal of said first optical connection region and is smaller than a core size that minimizes a mode field width of light propagating in said first connection region; and
   a second optical connection region having a first input/output terminal directly connected to a second of said at least one input/output terminal of said first insertion region and a second input/output terminal directly connected to an input/output terminal of a second insertion region, said first and second input/output terminals of said second optical connection region having core sizes equal to core sizes of said input/output terminals of said first and second insertion regions to which said second optical connection region is connected.

16. An optical waveguide device comprising:
a waveguide substrate; and
an optical waveguide disposed on said waveguide substrate and formed from a core for propagating light therein and a cladding layer covering said core, said optical waveguide including:
   an optical waveguide region having at least two input/output terminals;
   an insertion region having at least one input/output terminal, a refractive index difference between a core and a cladding layer in said insertion region being smaller than a refractive index difference between a core and a cladding layer at a predetermined portion of said optical waveguide region, said insertion region being constructed and arranged for allowing an optical functional component to be inserted therein for performing a predetermined function; and
   a first optical connection region having a first input/output terminal directly connected to one of said at least two input/output terminals of said optical waveguide region and a second input/output terminal directly connected to one of said at least one input/output terminal of said insertion region, a refractive index difference between a core and a cladding layer in said first optical connection region continuously decreasing in a direction from said first to second input/output terminal thereof.

17. An optical waveguide device comprising:
a waveguide substrate;
an optical waveguide disposed on said waveguide substrate and formed from a core for propagating light therein and a cladding layer covering said core, said optical waveguide including:
   an optical waveguide region having at least two input/output terminals;
   a first insertion region having at least two input/output terminals and a mode field width of light propagating therein larger than that of light propagating at a predetermined portion of said optical waveguide region, said first insertion region being constructed and arranged for allowing an optical functional component to be inserted therein for performing a predetermined function; and
   a first optical connection region for changing a mode field width of light propagating therein, said first optical connection region having a first input/output terminal directly connected to one of said at least two input/output terminals of said optical waveguide region and a second input/output terminal directly connected to a first of said at least two input/output terminals of said first insertion region, a refractive index difference between a core and a cladding layer in said first optical connection region continuously decreasing in a direction from said first to said second input/out terminal thereof; and
   a second optical connection region having a first input/output terminal directly connected to a second of said at least two input/output terminals of said first insertion region and a second input/output terminal directly connected to an input/output terminal of a second insertion region,
   wherein a refractive index difference between a core and a cladding layer in said second optical connection region is equal to a refractive index difference between a core and a cladding layer in said first insertion region to which said second optical connection region is connected, and smaller than a refractive index difference between a core and a cladding layer at a predetermined portion of said optical waveguide region.

18. A device according to claim 15, wherein said first optical connection region has a core of a sectional shape which is tapered, in a horizontal direction with respect to a main surface of said waveguide substrate, toward a direction from said first to second input/output terminal thereof at a predetermined angle with respect to an optical axis of said core.

* * * * *